(12) United States Patent
Tsutsumikoshi (10) Patent No.: US 6,591,934 B2
(45) Date of Patent: Jul. 15, 2003

(54) MOTORCYCLE

(75) Inventor: Shinobu Tsutsumikoshi, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/946,329

(22) Filed: Sep. 6, 2001

(65) Prior Publication Data

US 2002/0027032 A1 Mar. 7, 2002

(30) Foreign Application Priority Data

Sep. 6, 2002 (JP) ........................................ 2000-270378

(51) Int. Cl.[7] ................................................ B60K 8/00
(52) U.S. Cl. ........................ 180/291; 180/219; 180/297; 123/192.2; 123/195 HC
(58) Field of Search ................................ 180/291, 297, 180/218, 219; 123/192.2, 195 H, 195 HC (56) References Cited

U.S. PATENT DOCUMENTS

| | | | | |
|---|---|---|---|---|
| 4,618,019 A | * | 10/1986 | Ando et al. ................... | 180/219 |
| 4,901,813 A | * | 2/1990 | Kimura et al. ................ | 180/219 |
| D306,710 S | * | 3/1990 | Grattapaglia ................ | D12/110 |
| 5,038,731 A | * | 8/1991 | Shimada ................... | 123/192.2 |
| 5,433,286 A | * | 7/1995 | Kumamaru et al. ......... | 180/219 |
| 5,439,585 A | * | 8/1995 | Arakawa ................. | 123/196 A |
| 5,884,599 A | * | 3/1999 | Shiozaki et al. .......... | 123/192.2 |
| 6,109,383 A | * | 8/2000 | Matsuto et al. ............. | 180/220 |
| 6,397,810 B2 | * | 6/2002 | Ohyama et al. .......... | 123/192.2 |
| 6,397,964 B1 | * | 6/2002 | Yamauchi ................... | 180/229 |
| 6,405,821 B2 | * | 6/2002 | Tsutsumikoshi ............ | 180/226 |
| 2001/0007293 A1 | * | 7/2001 | Yamauchi ................... | 180/219 |
| 2002/0007977 A1 | * | 1/2002 | Ishii et al. ................... | 180/219 |
| 2002/0017266 A1 | * | 2/2002 | Tsutsumikoshi ........ | 123/195 R |

FOREIGN PATENT DOCUMENTS

| | | | | |
|---|---|---|---|---|
| EP | 1178193 A2 | * | 2/2002 | ............ B62M/7/00 |
| JP | 59012110 A | * | 1/1984 | ........... F01M/11/02 |
| JP | 02248626 A | * | 10/1990 | ............ F02B/61/02 |
| JP | 05131963 A | * | 5/1993 | ............ B62J/35/00 |
| JP | 1998-167156 | | 6/1998 | |
| JP | 10-324287 | | 12/1998 | |
| JP | 11-129969 | | 5/1999 | |
| JP | 2000-280960 | | 10/2000 | |
| JP | 2001097273 A | * | 4/2001 | .......... B62M/11/14 |
| JP | 2001213380 A | * | 8/2001 | ............ B62M/7/02 |

* cited by examiner

*Primary Examiner*—Lesley D. Morris
*Assistant Examiner*—Daniel Yeagley
(74) *Attorney, Agent, or Firm*—Oblon, Spivak, McClelland, Maier & Neustadt, P.C.

(57) ABSTRACT

In a motorcycle, a crankshaft and a balancer shaft are supported on a matching surface between a cylinder block and a crankcase, the balancer shaft is arranged above a crankshaft, auxiliary devices of a engine unit are placed in front of and behind the balancer shaft, the auxiliary devices with smaller outer diameters among the auxiliary devices are arranged in front of the balancer shaft, the auxiliary devices with larger outer diameters are arranged behind the balancer shaft, and an oil filter is provided in a lower portion of the cylinder block.

2 Claims, 7 Drawing Sheets

MOTORCYCLE

BACKGROUND OF THE INVENTION

The present invention relates to a scooter type motorcycle.

In general, a power unit mounted on the scooter type motorcycle is structured such that a V-belt type transmission unit is uniformly connected to a rear portion of an engine unit, and a rear wheel is supported directly to an aftermost portion of the transmission unit A front portion of the power unit (a portion of the engine unit) is pivoted to a body frame, and a rear portion (a portion of the transmission unit) is suspended to the body frame via a shock absorber, whereby a whole power unit vertically swings together with the rear wheel, and serves as a swing arm of the rear wheel.

In accordance with the structure mentioned above, there are advantages that a great capacity of an article accommodation box placed above the power unit may be obtained as well as an improved riding comfort may be obtained by making a vibration of the engine unit hard to transmit to the body frame.

On the contrary, however, a weight of the whole power unit will be increased when an engine displacement is increased, and a load to the rear wheel will also be increased; so that a load distribution between the front and rear wheels becomes improper.

Moreover, a rigidity for supporting the rear wheel becomes insufficient, whereby there is a problem that a steering performance and a riding stability are deteriorated.

Accordingly, as shown in Japanese Patent Application Laid-Open Publication Nos. 10-324287 and 11-129969, there has been developed a motorcycle with the engine unit and the transmission unit fixed to the body frame, and only a shaft drive unit extends rearward from the transmission unit which swings vertically, thereby driving the rear wheel.

With the structure mentioned above, it is possible to mount the engine unit, i.e. a heavy load, close to the front portion of the body frame in the same manner as that of the ordinal type motorcycle so as to make the load distribution between the front and rear wheels proper.

In this embodiment, a center axis of the cylinder bore of the engine unit is tilted forward substantially along the longitudinal direction of the vehicle body, whereby a height of the engine unit is reduced.

In order to mount the engine unit close to the front portion of the body frame in the scooter type motorcycle, a center console must be formed, and the engine unit must be arranged so as to extend from the inner portion of the center console toward the lower portion of the seat.

However, since the center console is generally formed in the center of the low bottom floor type step board provided between the handle bar and the seat, heights of the center console may restrict a size of a footing space over the step board and an ability to get on and off easy onto the motorcycle is deteriorated.

In particular, in the embodiment of mounting a four-cycle type engine unit having a large engine displacement provided with a balancer shaft for reducing a vibration, a lot of auxiliary devices such as the balancer shaft, a generator, a starter motor and the like are placed, whereby a whole engine unit tends to be large-scaled, and further, since it is necessary to provide the auxiliary devices above the engine unit with taking a water tightness into consideration, the size of the footing space is further restricted.

Furthermore, in this kind of motorcycle (the scooter type), the seat hinge is generally provided at the front end of the seat and the article accommodation box below the seat is accessible by rotating the seat upwardly around the seat hinge.

However, in order to obtain the large footing space over the step board, the height of the frame pipe composing the body frame becomes inherently lower than the position of the seat, so that it is necessary to stand up an extension upward extending high from the frame pipe for the purpose of supporting the seat hinge of the seat, which makes it impossible to support the seat hinge with a high rigidity.

SUMMARY OF THE INVENTION

An object of the present invention is to substantially eliminate defects or drawbacks encountered in the prior art described above and to make it possible to place a seat hinge at a front end of a seat in a body frame with a high rigidity, and to make it easy to replace an oil filter.

This and other objects can be achieved according to the present invention by providing a motorcycle comprising a low bottom floor type step board provided between a handle bar and a seat, an engine unit arranged so as to extend from an inner portion of a center console provided in a center portion in a vehicle width direction of the step board toward a lower portion of the seat, the engine unit structured such that a cylinder head, a cylinder block and a crankcase are combined in order from a front, a center axis of a cylinder bore formed in an inner portion of the cylinder block substantially extends along a vehicle body longitudinal direction, and a crankshaft and a balancer shaft are provided along the vehicle width direction substantially perpendicular to the center axis of the cylinder bore, the motorcycle comprising:

the crankshaft and the balancer shaft supported on a matching surface between the cylinder block and the crankcase, the balancer shaft arranged above the crankshaft, auxiliary devices of the engine unit placed in front of and behind the balancer shaft, wherein the auxiliary devices with smaller outer diameters among the auxiliary devices is arranged in front of the balancer shaft, the auxiliary devices with larger outer diameters is arranged behind the balancer shaft, and an oil filter is provided in a lower portion of the cylinder block.

In preferred embodiments, the motorcycle further comprising a pair of right and left frame pipes passing through an inner portion of the center console curved along upper profiles of the cylinder head, the cylinder block and the auxiliary devices.

Further, the motorcycle comprising a pair of right and left frame pipes passing through the inner portion of the center console connected between portions passing through above the auxiliary devices having larger outer diameters placed in the upper portion of the engine unit by a cross member extending in the vehicle width direction, the cross member positioned below a portion near a front end of the seat, the frame pipe disposed in front of the cross member inclined forward downward, and a seat hinge at the front end of the seat provided at an upper end of an extension protruded above from the cross member.

Furthermore, the auxiliary device arranged in front of the balancer shaft is a starter motor, and the auxiliary device arranged behind the balancer shaft is a generator.

According to the motorcycle of the present invention of the characters described above, since the auxiliary devices are provided in the upper portion of the engine unit, it is possible to secure an improved water tightness of the auxiliary devices.

Further, the oil filter is provided below the engine unit, whereby oil dropping down at a time of replacing the oil filter will not drop onto the engine unit, so that it is easy to replace the oil filter.

Furthermore, even in the case that the oil filter is positioned below the engine unit, whereby a space above the engine unit is reduced, the auxiliary devices having the small outer diameters are arranged in front of the balancer shaft, whereby it is possible to keep the height of the center console to a low level and it is possible to obtain a large footing space.

Moreover, since the height of the frame pipe passing through the inner portion of the center console is reduced, it is possible to sufficiently reduce the height of the center console so as to obtain a large footing space, and it is possible to reduce a distance between the cross member connecting between the right and left frame pipes and the seat hinge at the front end of the seat so as to reduce the length of the extension, thereby placing the seat hinge in the body frame with a high rigidity.

Further, the starter motor has an outer diameter smaller than that of the generator, generally, it is possible to reduce the height of the center console on the basis of the structure mentioned above so as to obtain a wide footing space.

DESCRIPTION OF THE PREFERRED EMBODIMENT

One embodiment of the present invention will be described hereunder with reference to the accompanying drawings.

Figure 1:
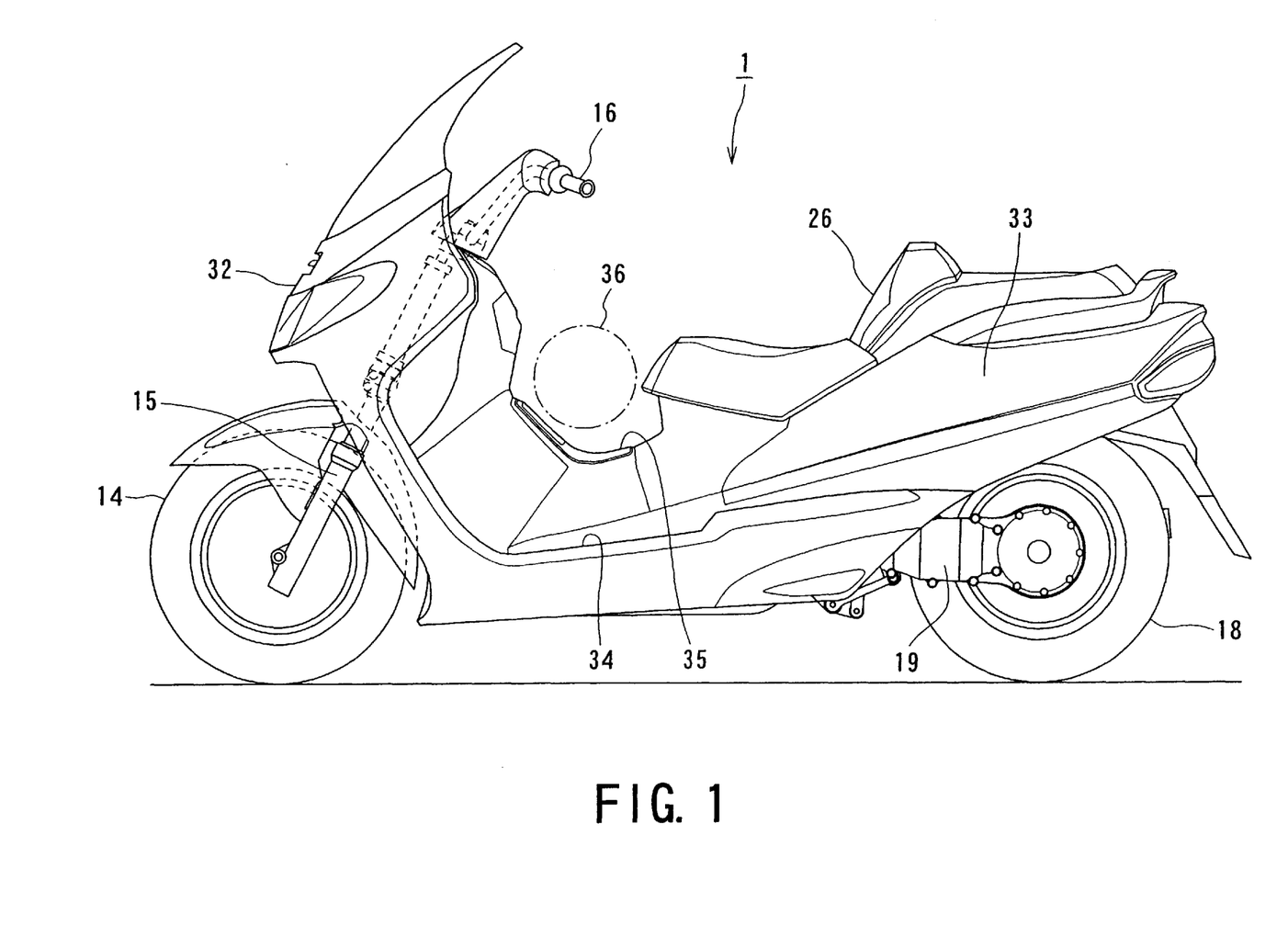
FIG. 1 is a general left side view showing a brief outer appearance of a scooter type motorcycle to which the present invention is applicable.
Figure 2:
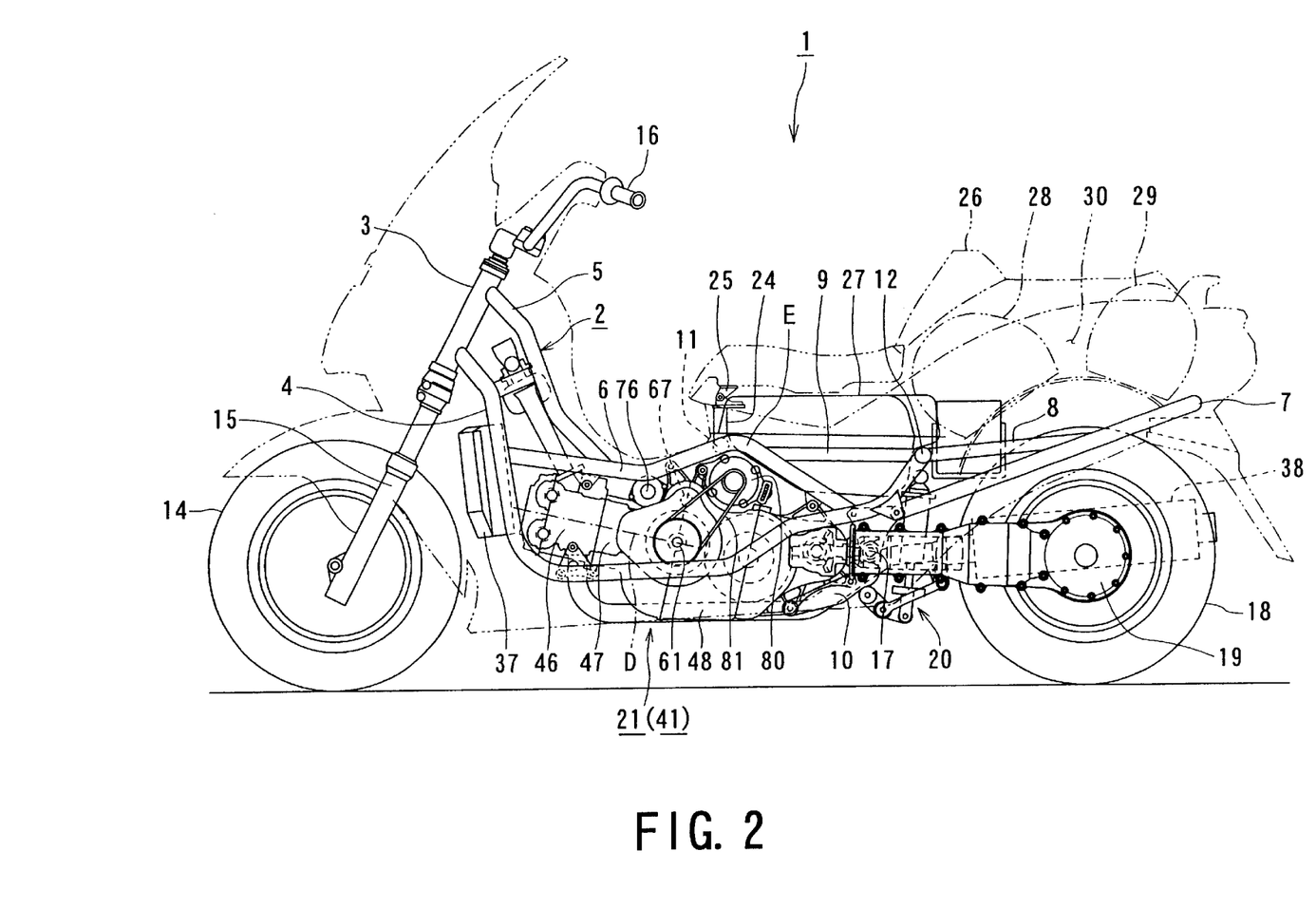
FIG. 2 is a left side perspective view showing an internal structure of the motorcycle representing one embodiment relating to the present invention.
Figure 3:
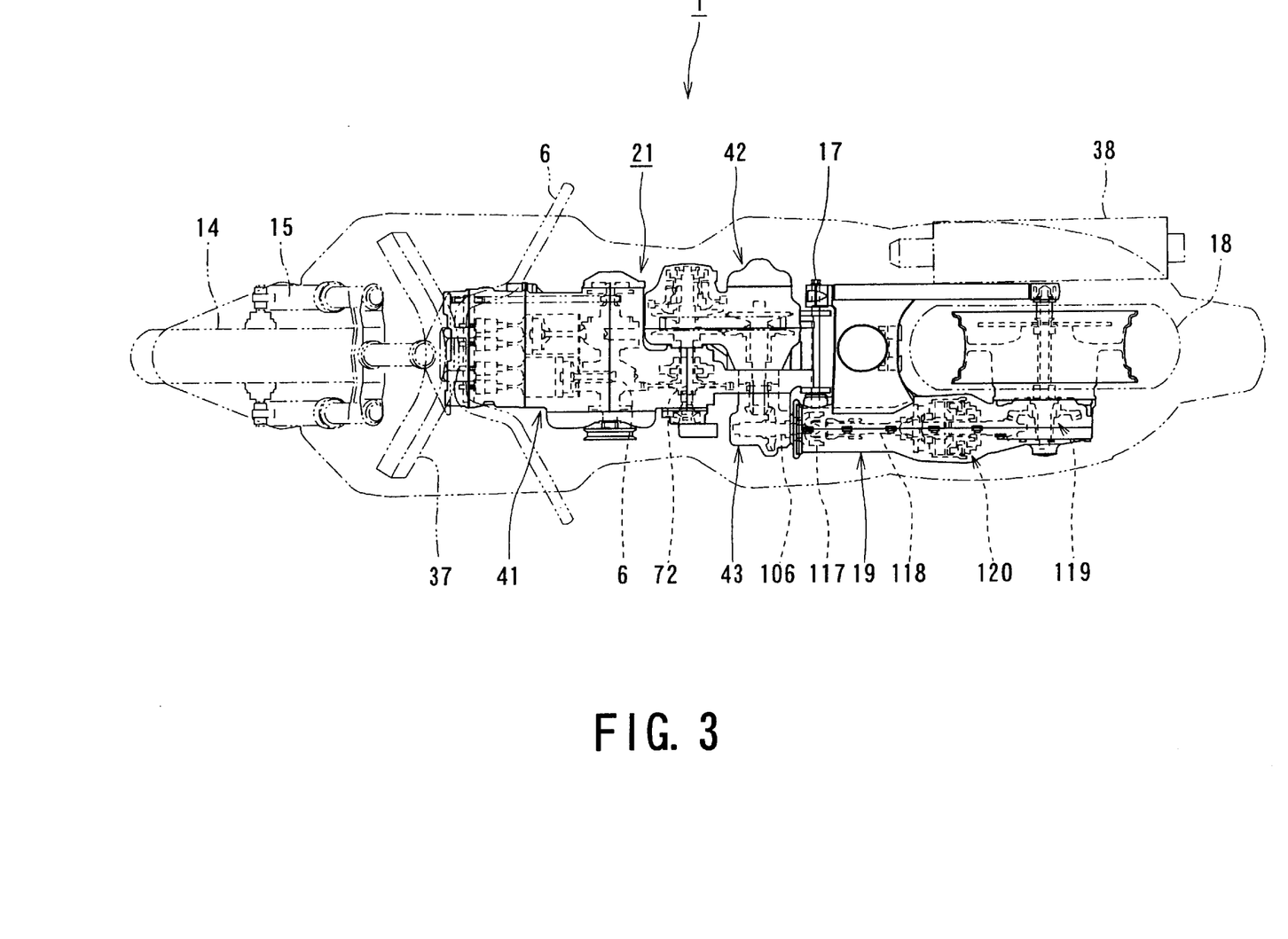
FIG. 3 is a plan view showing an internal structure of the motorcycle.

FIG. 1 is a general left side view showing a scooter type motorcycle with a power unit including an engine unit is mounted to which the present invention is applicable. FIG. 2 is a left side perspective view showing an internal structure of the motorcycle, and FIG. 3 is a plan view of the same.

A motorcycle 1 is provided with a body frame 2 made of a steel pipe. The body frame 2 is formed in a substantially underbone type, being provided with a head pipe 3 positioned at a front end thereof, a pair of right and left down pipes 4, upper pipes 5 and middle pipes 6 extending rearward from the head pipe 3, rear pipes 7 and rear stays 8 which are connected to portions near rear ends of the down pipes 4, a pair of right and left seat pipes 9, and a pair of right and left pivot plates 10 positioned in a substantially center portion.

In this embodiment, a pair of right and left pipe members (4, 5, 6) are respectively connected therebetween by a plurality of cross members 11, 12, . . . (the others are not shown) extending in a vehicle width direction.

A front fork 15 supporting a front wheel 14 is pivoted to the head pipe 3 together with a handle bar 16 and the like. A pivot shaft 17 is laid between the right and left pivot plates 10, and a swing transmission unit 19 supporting a rear wheel 18 is mounted swingabley to the pivot shaft 17 so as to be suspended by a suspension mechanism 20 in an absorbing manner.

Further, a power unit 21 is suspended and supported by the down pipes 4, the middle pipes 6 and the pivot plates 10, and the structure is made such that a power thereof is transmitted to the rear wheel 18 via the swing transmission unit 19.

An interval between the right and left middle pipes 6 is made narrower than an interval between the down pipes 4, while the middle pipes 6 extend above the power unit 21 and the down pipes 4 extend along both side portions of the power unit 21.

A seat hinge 25 is provided at an upper end of a seat stay 24 (which corresponds to an extension) that extends shortly upward from a cross member 11 and laid between middle portions of the right and left middle pipes 6, and a front end of a seat 26 is supported to the seat hinge 25.

A fuel tank 27, and a article accommodation box 30 capable of accommodating helmets 28 and 29 and the like, are formed below the seat 26, and the fuel tank 27 and the article accommodation box 30 become accessible by rotating the seat 26 upwardly around the seat hinge 25.

A front cowling 32 and a frame cover 33, which are made of a synthetic resin, cover an entire vehicle body for improving an outer appearance of the motorcycle 1 and for protecting internal devices.

Further, a low bottom floor type step board 34 (refer to FIG. 1) positioned between the handle bar 16 and the seat 26, and positioned above the down pipe 4 is uniformly formed with the frame cover 33. A center console 35 is provided in a center portion of the step board 34 in a vehicle width direction.

A pair of middle pipes 6 composing the body frame 2 extend through an inner portion of the center console 35, and an engine unit 41 which corresponds to a main composition of the power unit 21 is arranged so as to extend from the inner portion of the center console 35 toward the bottom part of the seat 26.

Further, a space above the center console 35 forms a footing space 36 used at a time when a rider rides over the seat 26 or gets off from the seat 26.

Furthermore, a radiator 37 for cooling the engine unit 41 is provided on the down pipes 4 so as to be positioned immediately behind the front wheel 14 while an exhaust muffler 38 connected to a cylinder head 46 of the engine unit 41 is provided in a right side of the rear wheel 18.

Figure 4:
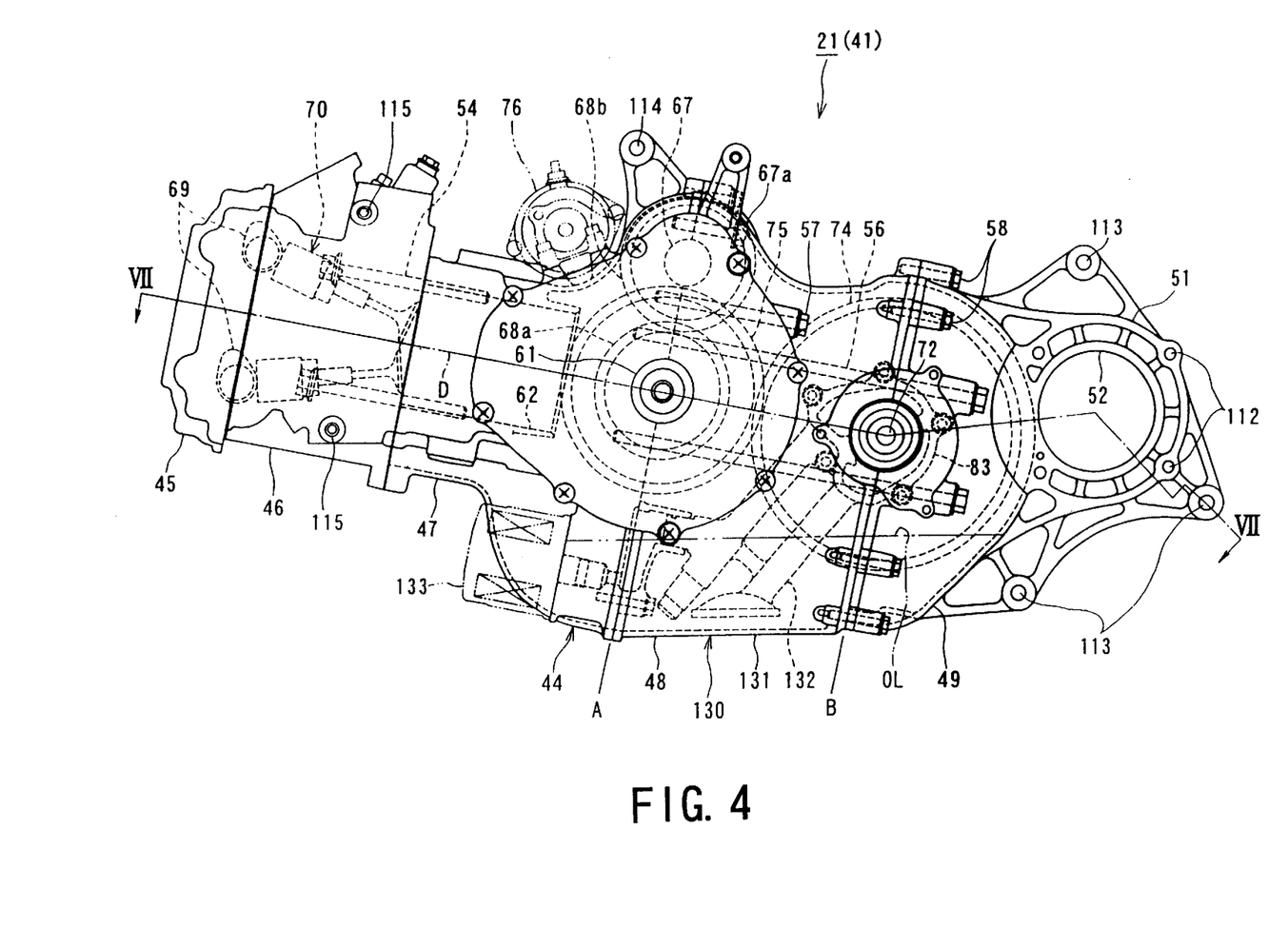
FIG. 4 is a left side view of a power unit (an engine unit)
Figure 5:
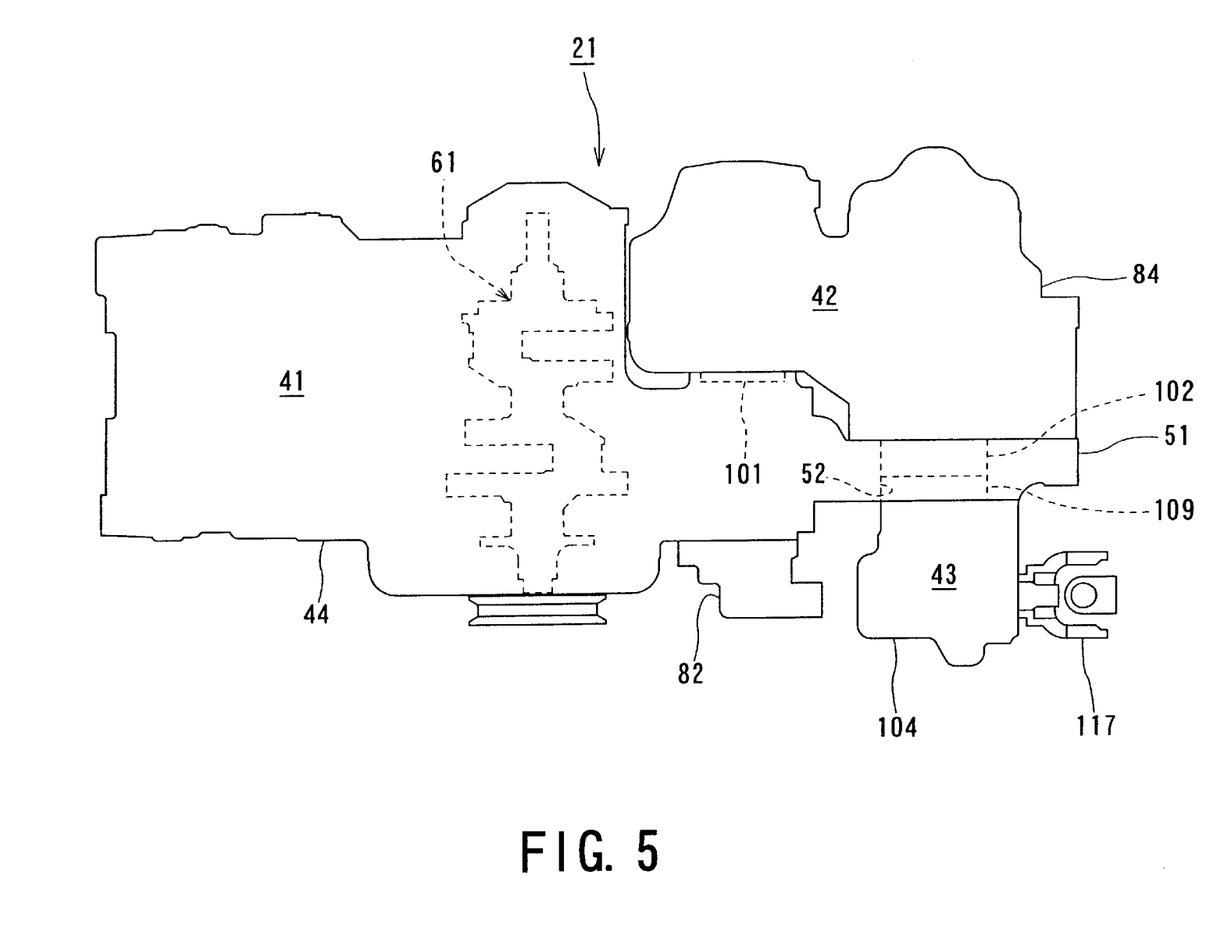
FIG. 5 is a plan schematic view of the power unit.
Figure 6:
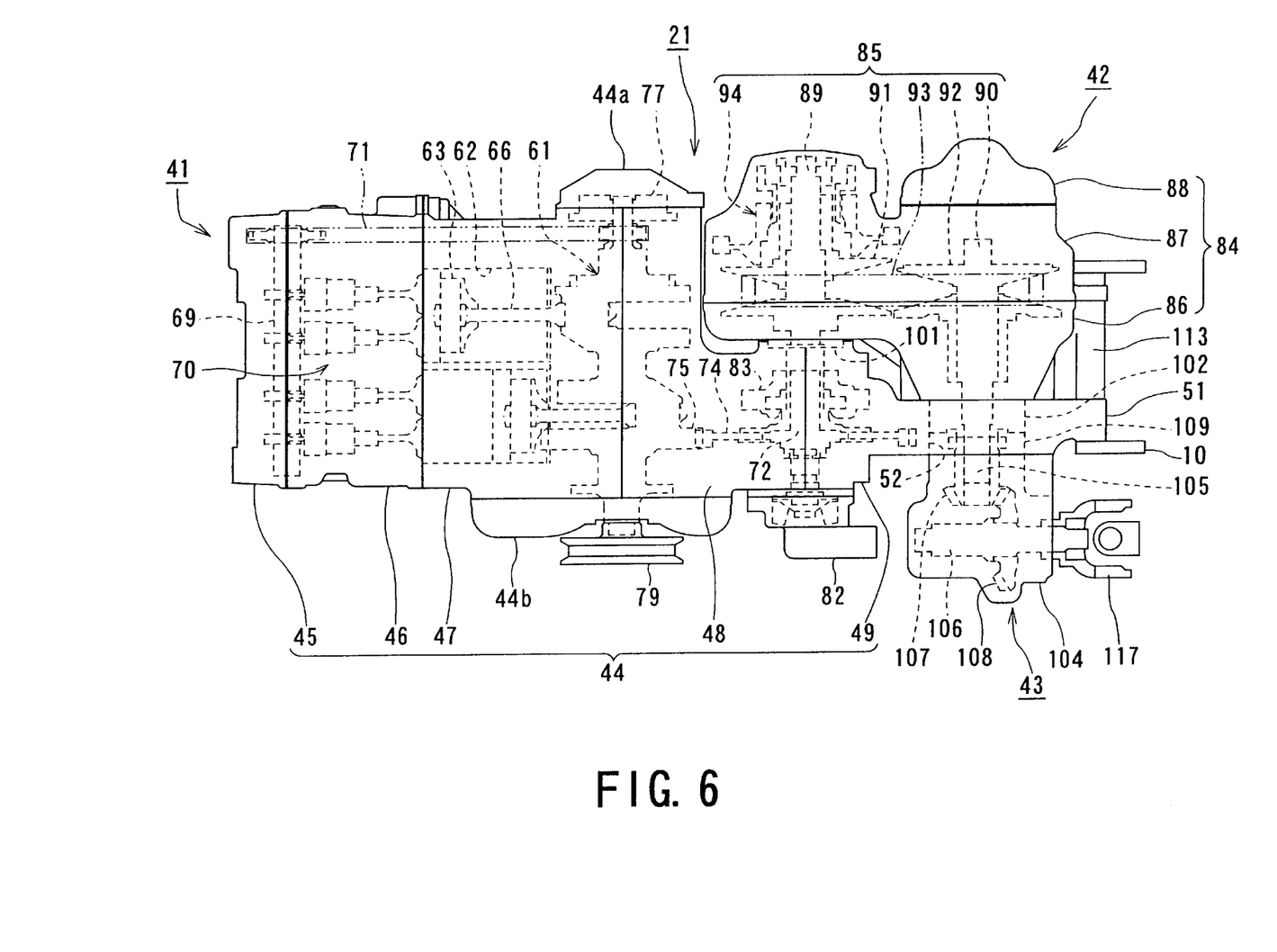
FIG. 6 is a plan view of the power unit.
Figure 7:
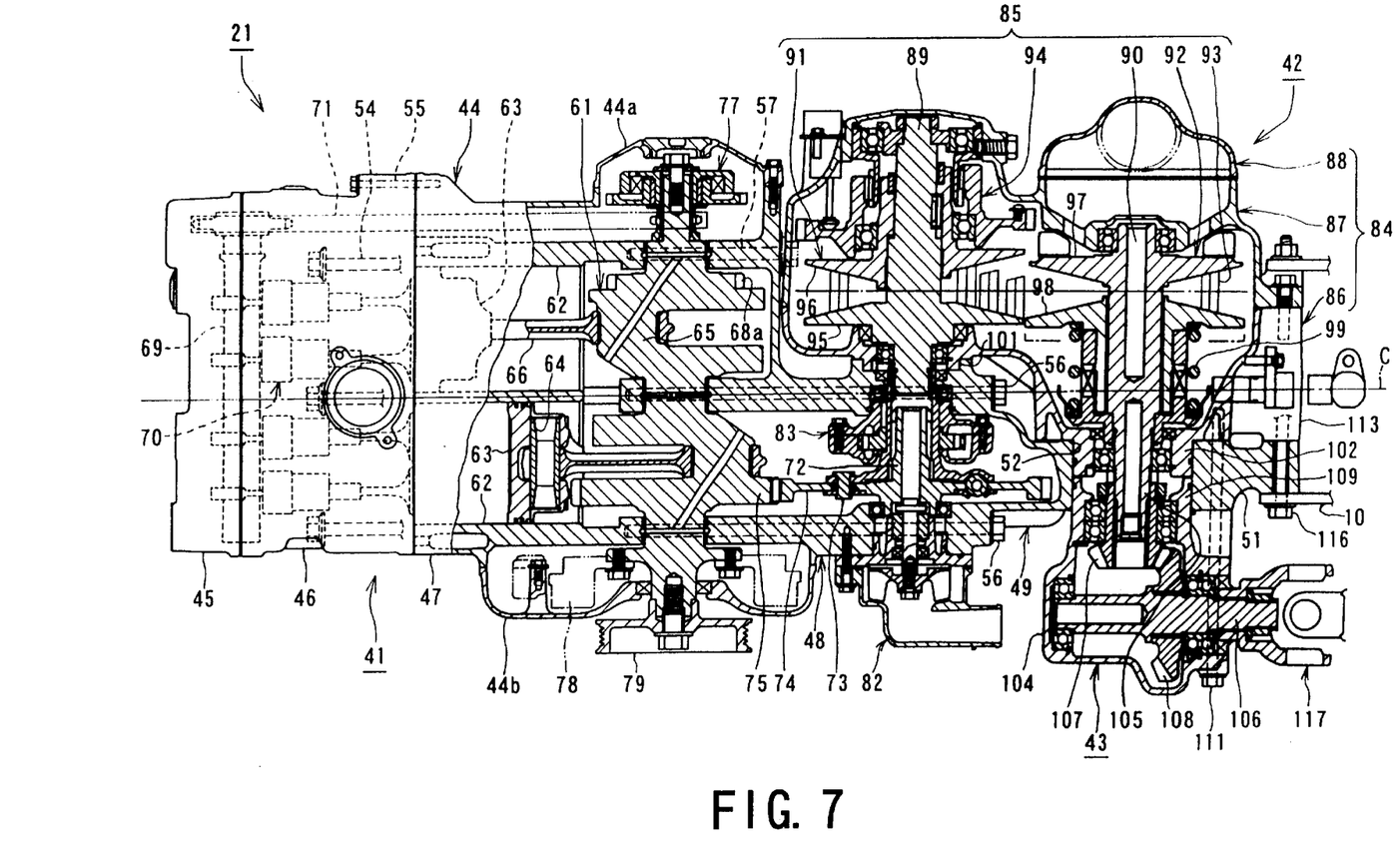
FIG. 7 is a horizontal cross sectional view taken along the line VII—VII of FIG. 4 showing a structure of the power unit.

FIG. 4 is a left side view of the power unit 21 (the engine unit 41), FIG. 5 is a plan schematic view of the power unit 21, FIG. 6 is a plan view of the same, and FIG. 7 is a horizontal cross sectional view of the power unit 21 taken along the line VII—VII of FIG. 4.

As shown in FIGS. 5 to 7, the power unit 21 is a composite obtained by combining the engine unit 41, a transmission unit 42 and a bevel unit 43.

A casing 44 of the engine unit 41 is constructed by combining a head cover 45, a cylinder head 46, a cylinder block 47, a crankcase 48 and a rear case 49 in sequence from the forward portion, while a vertical-plate-shaped bracket portion 51 extending rearward is uniformly formed with a rear portion of the rear case 49, and a fitting hole 52 extending through the bracket portion 51 in the vehicle width direction is pieced in the bracket portion 51.

The cylinder head 46 is fastened and fixed to the cylinder block 47 by six long fixing bolts 54 and one short fixing bolt 55, as shown in FIGS. 4 and 7.

On the contrary, the crankcase 48 and the rear case 49 are fastened and fixed to the cylinder block 47 by four through bolts 56 and a plurality of fixing bolts 57.

The through bolts 56 are inserted from the rear case 49 side and extend through the rear case 49 and the crankcase 48 so as to be fastened to the cylinder block 47; the rear case 49 and the crankcase 48 are fastened together with the cylinder block 47.

Further, the fixing bolt 57 is shorter than the through bolt 56 and is inserted only to the crankcase 48 so as to be fastened to the cylinder block 47.

Furthermore, a periphery of the rear case 49 is fastened and fixed to the crankcase 48 by several short fixing bolts 58.

On the contrary, a crankshaft 61 extending along the vehicle width direction is supported on a matching surface A (refer to FIG. 4) between the cylinder block 47 and the crankcase 48, and two right and left cylinder bores 62 are formed in an inner portion of the cylinder block 47.

The cylinder bore 62 is provided so that a center axis D of the cylinder bore 62 substantially extends along a longitudinal direction of the vehicle body in a side view of the vehicle and is inclined slightly upward to the front.

A piston 63 is inserted to the cylinder bore 62, and a piston pin 64 and a crank pin 65 of the crankshaft 61 are connected therebetween by a connecting rod 66, whereby a reciprocation of the piston 63 within the cylinder bore 62 is transformed to a rotary motion of the crankshaft 61 so as to generate an output of the engine unit 41.

Further, a balancer shaft 67 for negating an engine vibration is supported above the crankshaft 61, and this balancer shaft 67 is also supported on the matching surface A between the cylinder block 47 and the crankcase 48, and is driven by the crankshaft 61 via constant velocity gears 68a and 68b.

A balancer housing 67a for housing the balancer shaft 67 is formed in an upper portion of the cylinder block 47 and the crankcase 48.

On the contrary, two camshafts 69 and a valve operating mechanism 70 are disposed within the cylinder head 46. Each of the cam shafts 69 is driven by the crankshaft 61 via a timing chain 71, and an intake and exhaust operation within the cylinder bore 62 (a combustion chamber) is executed by operating the valve operating mechanism 70 at a predetermined timing.

Further, a counter shaft 72 extending in parallel with the crankshaft 61 is supported on a matching surface B between the crankcase 48 and the rear case 49. An axial length of the counter shaft 72 is widely shorter than the crankshaft 61.

A rear portion of the crankcase 48, which corresponds to a housing portion of the counter shaft 72 and the rear case 49, is arranged in an offset manner close to one side (for example, close to a left side) with respect to a vehicle body center line C in a plan view (refer to FIG. 7), and a plan shape of the engine unit 41 is formed in a substantially L shape together with the bracket portion 51 positioned at a rear portion thereof.

Since a counter driven gear 74 coaxially provided close to a left end of the counter shaft 72 via a shock absorbing mechanism 73 is engaged with a counter drive gear 75 formed in a crank web in a left end portion of the crankshaft 61, the counter shaft 72, interlocking with the forward rotating crankshaft 61, rotates backward and a shock caused by a rotational torque fluctuation of the crankshaft 61 or the like is absorbed by the shock absorbing mechanism 73.

In this embodiment, a right end portion of the crankshaft 61 is covered by a case cover 44a, and a one way clutch mechanism 77 receiving a power from a starter motor 76 for starting the engine, shown in FIG. 4, is provided inside the right end portion.

On the contrary, a left end portion of the crankshaft 61 is covered by a case cover 44b. A flywheel 78 and a belt pulley 79 are provided respectively inside the left end portion and outside the left end portion of the crankshaft 61 so as to uniformly rotate therewith, and an alternator 80 (refer to FIG. 2), which corresponds to a generator placed above the power unit 21, is driven by the belt pulley 79 via a belt 81.

Further, a water pump 82 for circulating a cooling water is provided in a left end portion of the counter shaft 72 and a left side portion of the rear case 49, while an oil pump 83 for supplying an engine oil is provided in a right end portion of the counter shaft 72 and an inner portion of the rear case 49, and the structure is made such that these pumps 82 and 83 are directly driven by the counter shaft 72.

As shown in FIGS. 2 and 4, the auxiliary devices of the engine unit 41 such as the starter motor 76 and the alternator 80 are placed in front of and at the back of the balancer shaft 67 (the balancer housing 67a).

The starter motor 76, which corresponds, to the auxiliary device having a smaller outer diameter is arranged in front of the balancer 67 (the balancer housing 67a), and the alternator 80 which corresponds to the auxiliary device having a larger outer diameter is arranged behind the balancer 67.

As mentioned above, since the auxiliary devices such as the starter motor 76 and the alternator 80 are placed in front of and behind the balancer 67 supported above the crankshaft 61, improved water tightness for each of the auxiliary devices is secured.

Further, since the starter motor 76 generally has a smaller outer diameter than that of the alternator 80, it is possible to keep a height of the center console 35 low so as to obtain a large footing space 36 over the center console 35 by arranging the starter motor 76 in front of the balancer shaft 67 and arranging the alternator 80 behind the balancer 67.

In particular, in the case of mounting an oil filter 133 at a lower portion of the cylinder block 47 in order to improve a replacing ability of the oil filter 133 as mentioned later, a space above the engine unit 41 (the cylinder block 47) tends to be reduced.

However, by setting the starter motor 76, as the auxiliary device having the smaller outer diameter, positioned in front of the balancer shaft 6, a wide footing space 36 may be obtained.

In this embodiment, the middle pipes 6, which corresponds to a pair of right and left frame pipes extending through the inner portion of the center console 35, are formed in a curved manner along the upper profiles of the cylinder head 46, the cylinder block 47, the starter motor 76, and the alternator 80.

Accordingly, the height of the center console 35 is further kept lowered and a large footing space 36 over the center console 35 may be obtained.

Further, the portions in which the middle pipes 6 pass through above the alternator 80 which corresponds to the auxiliary device having the larger outer diameter, are just connected by the cross member 11.

Supposing the portions are bending points E of the middle pipes 6, the bending points E are positioned below the portion close to the front end of the seat 26.

Sections in front of the bending points E extend forward so as to be slightly forward downward, being slightly forward upward after reaching the upper portion of the starter motor 76 and be connected to the front portions of the down pipes 4, while sections after the bending points E extend rearward so as to be rearward downward and be connected to the middle portions of the down pipes 4.

Accordingly, since the bending points E, which are the highest points of the middle pipes 6, are positioned near the portion below the front end of the seat 26, and the middle pipes 6 in front of the bending points E are lowered downward so as to be extended within the center console 35, it is possible to keep the height of the center console 35 to a sufficiently low level and it is possible to expand the footing space 36.

Further, since the distance between the cross member 11 provided between the bending points E of the middle pipes 6 and the seat hinge 25 is shortened, and the length of the seat stay 24 is reduced, it is possible to place the seat hinge 25 in the body frame 2 with a high rigidity.

In accordance with this embodiment, the portions behind the bending points E of the middle pipes 6 extend rearward so as to be rearward downward, and are connected to the middle portions of the down pipes 4.

However, the structure may be, for example, made such that the seat pipe 9 is removed by extending the portions after the bending points E of the middle pipes 6 rearward in a substantially horizontal manner so as to connect to the rear end portions of the down pipes 4, and rear ends of other pipe members (not shown) extending rearward obliquely downward from the bending points E of the middle pipes 6 are connected to the middle portions of the down pipes 4.

In short, it is sufficient if the sections in front of the bending points E (the cross member 11) of the middle pipes 6 are forward downward.

On the contrary, as shown in FIG. 4, a lower portion of a rear half portion of the cylinder block 47 and lower portions of the crankcase 48 and the rear case 49 are disposed below a bottom surface of the cylinder head 46 and a front half portion of the cylinder block 47.

These lowered portions form an oil storage portion 130, and oil is stored therewithin up to a height of an oil level OL. A bottom portion 131 of the oil storage portion 130 is formed in a flat shape, and a surface direction of the bottom plate 131 is substantially in parallel to a road surface while the center axis D of the cylinder bore 62 is slightly forward upward.

Further, an oil strainer 132 extending forward obliquely downward from the oil pump 83 reaches a portion close to the bottom portion 131 of the oil storage portion 130, and on the contrary, the oil filter 133 is replaceably placed on a front surface of the oil storage portion 130, below the balancer shaft 67 and the cylinder bore 62 in a side view of the vehicle, and above the bottom portion 131 of the oil storage portion 130.

By providing the oil filter 133 at this position, a replacing operability (an attaching and detaching ability) of the oil filter 133 will be improved, and soiling the portion around the engine unit 41 by the dropped oil at a time of replacing the oil filter 133 will be prevented.

On the contrary, the transmission unit 42 is structured such that a belt type transmission apparatus (for example, a CVT (continuously variable transmission)) 85 is placed within a casing 84, which is independent from the engine unit 41.

The casing 84 has a three-piece structure composed by an inner case 86 positioned at an inner side in the vehicle width direction, an outer case 87 covered in an outer side thereof in a liquid tight manner, and a case cover 88 covered in an outer side of the outer case 87.

The belt type transmission apparatus 85 is structured such as to be provided with an input shaft 89 and an output shaft 90 which are respectively supported in a front portion and a rear portion within the casing 84 in parallel with the crankshaft 61, an input V pulley 91 and an output V pulley 92 which are respectively supported onto the shafts 89 and 90 so as to rotate uniformly, a V belt (or a metal belt) 93 wound between both of the V pulleys 91 and 92, and a face driving mechanism 94 coaxially provided with the input V pulley 91.

The input V pulley 91 has a fixed face 95 formed uniformly with the input shaft 89 and a movable face 96 provided so as to move freely in an axial direction, and a position of the movable face 96 is determined by the face driving mechanism 94.

Further, the output V pulley 92 also has a fixed face 97 and a movable face 98, and the movable face 98 is always pressed to the fixed face 97 side by a spring 99.

In this embodiment, the input V pulley 91 is arranged close to a left end of the input shaft 89. The output V pulley 92 is arranged close to a right end of the output shaft 90, while the input V pulley 91 and the output V pulley 92 are arranged so as to be aligned in a longitudinal direction.

Further, the face driving mechanism 94 is arranged in a right side of the input V pulley 91, and a blower apparatus composed by the case cover 88 is provided behind the face driving mechanism 94 and in a right side of the output V pulley 92.

As described above, since the input V pulley 91 and the output V pulley 92 are longitudinally arranged, the face driving mechanism 94 and the blower apparatus are also aligned longitudinally, and the output shaft 90 is arranged so as to protrude inward in the vehicle width direction from the output V pulley 92, a plan shape of the transmission unit 42 is formed in a substantially L shape.

A bearing boss 101 provided on a front left side surface of the transmission unit 42 (the inner case 86) is fitted and fixed to a right side surface of a joint portion between the crankcase 48 and the rear case 49 of the engine unit 41 tightly, and the input shaft 89 extending through the bearing boss 101 and the counter shaft 72 of the engine unit 41 are connected in a spline connection or the like so as to rotate uniformly.

On the contrary, a rear left side surface of the transmission unit 42 (the inner case 86) is disposed adjacent to a right side surface (a side of the vehicle body center line C) of the bracket portion 51 in the engine unit 41, and a bearing boss 102 of the output shaft 90 is fitted to the fitting hole 52 of the bracket portion 51 tightly.

In the manner mentioned above, plan shapes of the engine unit 41 and the transmission unit 42 are formed in a substantially L shape, however, the substantially L-shaped portions are combined with each other so as to be formed in a substantially rectangular shape.

On the contrary, the bevel unit 43 is structured such that a bevel input shaft 105 extending along the vehicle width direction and a bevel output shaft 106 extending along the vehicle length direction are supported in an inner portion of an independent casing 104.

Further, an input bevel gear 107 and an output bevel gear 108 that engages with the input bevel gear 107 are respectively provided in the bevel input shaft 105 and the bevel output shaft 106 so as to rotate uniformly.

Furthermore, the bevel unit 43 is arranged on a left side surface (a side opposite to the vehicle body center line C) of the bracket 51 in the engine unit 41 so as to be adjacent to the bracket portion 51, a bearing boss 109 of the bevel input shaft 105 is fitted and fixed to the fitting hole 52 of the bracket 51 tightly, and the output shaft 90 and the bevel input shaft 105 are connected in a spline connection or the like so as to rotate uniformly.

As shown in FIG. 7, the structure is made such that a fastening member such as a through bolt 111 or the like is fastened to the transmission unit 42 from a left side through the bevel unit 43 and the bracket portion 51, and the bevel unit 43 and the bracket portion 51 are fastened to the transmission unit 42 together by the through bolt 111.

In this embodiment, the number of the through bolts 111 is four, and each of the through bolts 111 shown in FIG. 4 extends through each of through holes 112 formed at regular intervals in the periphery of the fitting hole 52 of the bracket portion 51.

In this embodiment, for example, three frame fixing portions 113 are provided in the periphery of the bracket portion 51, and these frame fixing portions 113, one frame fixing portion 114 provided in the cylinder block 47 as shown in FIG. 4 and two frame fixing portion 115 provided in the cylinder head 46 are respectively fastened to a fastening portion provided in the down pipes 4 of the body frame 2, the middle pipes 6 and the pivot plate 10 by fixing bolts 116 (refer to FIG. 7), whereby a whole power unit 21 is fixed to the body frame 2.

In the power unit 21 structured in the manner mentioned above, the rotation of the crankshaft 61 of the engine unit 41 is transmitted to the counter shaft 72, the input shaft 89 of the transmission unit 42 and the input V pulley 91; and the rotation of the input V pulley 91 is transmitted to the output V pulley 92 and the output shaft 90 by the V belt 93.

Further, the rotation of the transmission output shaft 90 is transmitted to the bevel output shaft 106 via the bevel input shaft 105 of the bevel unit 43, the input bevel gear 107 and the output bevel gear 108, and an engine output is taken out rearward from the bevel output shaft 106.

In this embodiment, since a gear number of the counter drive gear 75 is smaller than a gear number of the counter driven gear 74, the rotation of the crankshaft 61 is reduced primarily at a time of being transmitted to the counter shaft 72. Further, since a gear number of the input bevel gear 107 is smaller than a gear number of the output bevel gear 108, a secondary speed reduction is executed here.

Further, the rotation of the bevel output shaft 106 is transmitted to the drive shaft 118 supported within the swing transmission unit 19 via a universal joint 117 (refer to FIGS. 3, 5 and 6), and the rotation of the drive shaft 118 is transmitted to the rear wheel 18 via a rear bevel gear mechanism 119.

In this embodiment, for example, an electromagnetic type starter clutch 120 is provided in a middle portion of the drive shaft 118, and a power of the engine unit 41 is connected or disconnected with respect to the rear wheel 18 in accordance with an ON and OFF operation of the starter clutch 120.

By the way, the face driving mechanism 94 of the belt type transmission apparatus 85 in the transmission unit 42 receives a power of an actuator (not shown) controlled by a control means (not shown) and moves the movable face 96 of the input V pulley 91 in an axial direction in response to various conditions such as a running speed of the motorcycle 1, a throttle opening degree, an engine load and the like.

At a time of starting the motorcycle 1, for example, the face driving mechanism 94 moves the movable face 96 away from the fixed face 95 so as to make an actual belt-winding diameter of the input V pulley 91 in minimum.

In accordance therewith, for the output V pulley 92, since the movable face 98 is pressed to the fixed face 97 side by an urging force of the spring 99 and the actual belt winding diameter becomes maximum, a gear ratio becomes high and it makes easier to start.

Further, during the acceleration of the motorcycle 1, the face driving mechanism 94 gradually moves the movable face 96 of the input V pulley 91 close to the fixed face 95 side so as to expand the actual belt-winding diameter of the input V pulley 91.

Then, for the output V pulley 92, since the movable face 98 moves away from the fixed face 97 against the urging force of the spring 99, and the actual belt winding diameter is going to be reduced, the gear ratio becomes low and the vehicle speed is increased.

As mentioned above, in accordance with the structure of the motorcycle 1, even if the engine unit 41 is mounted so as to extend from the inner portion of the center console 35 provided in the center portion in the vehicle width direction of the low bottom floor type step board 34 provided between the handle bar 16 and the seat 26 to the below of the seat 26, it is possible to reduce the height of the center console 35 as much as possible so as to obtain the significantly large (wide) footing space 36 over the step board 34 while keeping the auxiliary devices (76, 80) provided in the engine unit 41 watertight.

Further, it is possible to place the seat hinge 25 at the front end of the seat 26 in the body frame 2 with a high rigidity, and it is possible to easily replace the oil filter 133.

By the way, although the engine that this invention is applied in the embodiment mentioned above has one cylinder head and one cylinder block, it is obvious that this invention is applicable to the engine that has more than one cylinder head and/or a cylinder block.

What is claimed is:

1. A motorcycle comprising a low bottom floor step board provided between a handle bar and a seat, an engine unit arranged so as to extend from an inner portion of a center console provided in a center portion in a vehicle width direction of said step board toward a lower portion of said seat, said engine unit structured such that a cylinder head, a cylinder block and a crankcase are combined in order from a front, a center axis of a cylinder bore formed in an inner portion of said cylinder block substantially extends along a vehicle body longitudinal direction, and a crankshaft and a balancer shaft are provided along said vehicle width direction substantially perpendicular to said center axis of said cylinder bore, said motorcycle comprising:

said crankshaft and said balancer shaft supported on a matching surface between said cylinder block and said crankcase, said balancer shaft arranged above said crankshaft, auxiliary devices of said engine unit placed in front of and behind said balancer shaft and below a pair of right and left frame pipes passing through an inner portion of said center console, wherein said auxiliary devices with smaller outer diameters among said auxiliary devices are arranged in front of said balancer shaft, said auxiliary devices with larger outer diameters are arranged behind said balancer shaft, an oil filter is provided in a lower portion of said cylinder block, said auxiliary devices arranged in front of said balancer shaft include a starter motor, said auxiliary devices arranged behind said balancer shaft include a generator, and said frame pipes curve along upper profiles of said cylinder head, said cylinder block and said auxiliary devices.

2. A motorcycle according to claim 1, further comprising:

said pair of right and left frame pipes passing through said inner portion of said center console connected between portions passing through above said generator arranged behind said balancer shaft by a cross member extending in said vehicle width direction, said cross member positioned below a portion near a front end of said seat, said frame pipe disposed in front of said cross member inclined forward downward, and a seat hinge at said front end of said seat provided at an upper end of an extension protruded above from said cross member.

* * * * *

UNITED STATES PATENT AND TRADEMARK OFFICE
CERTIFICATE OF CORRECTION

PATENT NO.    : 6,591,934 B2
DATED         : July 15, 2003
INVENTOR(S)   : Tsutsumikoshi It is certified that error appears in the above-identified patent and that said Letters Patent is hereby corrected as shown below:

<u>Title page,</u>
Item [30], Foreign Application Priority Data, should read:
-- [30]   Foreign Application Priority Data
Sep. 6, 2000 (JP)..........................2000-270378 --

Signed and Sealed this

Twenty-first Day of October, 2003

JAMES E. ROGAN
*Director of the United States Patent and Trademark Office*